United States Patent
Kobayashi

[11] Patent Number: 5,652,036
[45] Date of Patent: Jul. 29, 1997

[54] INFORMATION RECORDING MEDIUM AND METHOD OF MANUFACTURING THE SAME

[75] Inventor: Tadashi Kobayashi, Chiba, Japan

[73] Assignee: Kabushiki Kaisha Toshiba, Kawasaki, Japan

[21] Appl. No.: 528,668

[22] Filed: Sep. 15, 1995

[30] Foreign Application Priority Data

Sep. 21, 1994 [JP] Japan .................................. 6-226547

[51] Int. Cl.$^6$ .......................................................... B32B 3/00
[52] U.S. Cl. ....................... 428/64.1; 428/64.2; 428/64.4; 428/64.5; 428/64.6; 428/457; 428/913; 430/270.12; 430/270.13; 430/495.1; 430/945; 369/283; 369/288
[58] Field of Search ...................... 428/64.1, 64.2, 428/64.4, 64.5, 64.6, 457, 688, 913; 430/270.1, 270.11, 270.12, 270.13, 495.1, 945; 369/283, 288

[56] References Cited

U.S. PATENT DOCUMENTS 5,314,734  5/1994  Nishida et al. .

FOREIGN PATENT DOCUMENTS

| 60-160037 | 8/1985 | Japan . |
| 62-139152 | 6/1987 | Japan . |
| 62-226446 | 10/1987 | Japan . |
| 63-261548 | 10/1988 | Japan . |
| 3-17841 | 1/1991 | Japan . |
| 3-017841 | 1/1991 | Japan . |
| 4265541 | 9/1992 | Japan . |

OTHER PUBLICATIONS

"Material for a Reversible or Reloadable Optical Disk", H. Okuda, issued by Kogyo Chosakai, May 20, 1989 pp. 60–63.

*Primary Examiner*—Patrick Ryan
*Assistant Examiner*—Elizabeth Evans
*Attorney, Agent, or Firm*—Cushman, Darby & Cushman IP Group of Pillsbury Madison & Sutro LLP

[57] ABSTRACT

An information recording medium comprising a substrate, a phase-change type recording layer and capable of storing information therein through a phase-change of a portion thereof upon being irradiated by light beam, a first dielectric protecting layer interposed between the substrate and the recording layer, a second dielectric protecting layer formed on the recording layer, a first light-absorptive protecting layer comprising a dielectric material and at least one material selected from metals, semimetals and semiconductor materials and interposed between the recording layer and the first dielectric protecting layer, and a second light-absorptive protecting layer comprising a dielectric material and at least one material selected from metals, semimetals and semiconductor materials and interposed between the recording layer and the second dielectric protecting layer.

24 Claims, 5 Drawing Sheets

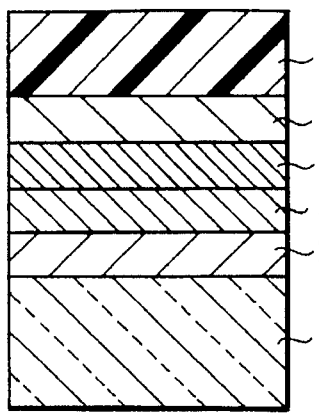
F I G. 13
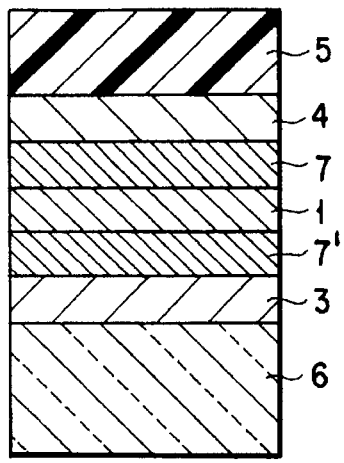
F I G. 14
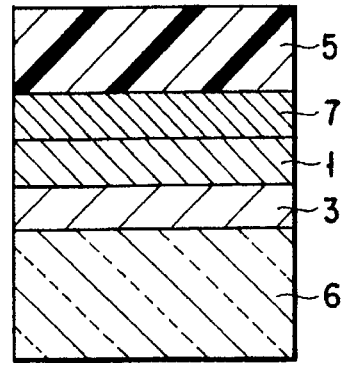
F I G. 15
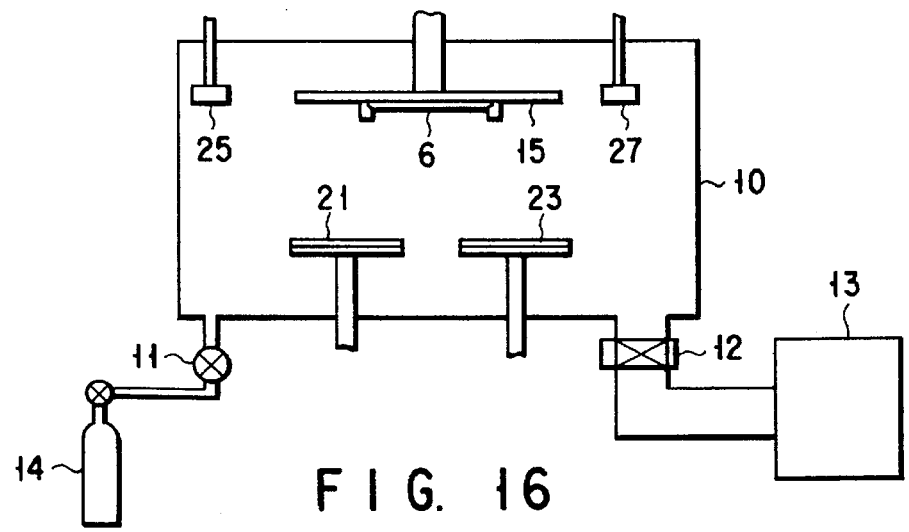
F I G. 16
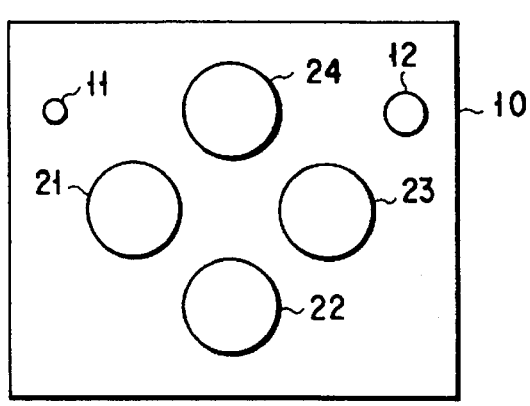
F I G. 17
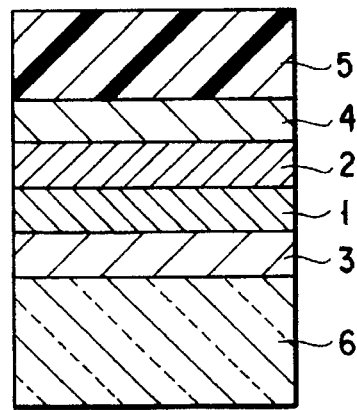
F I G. 18

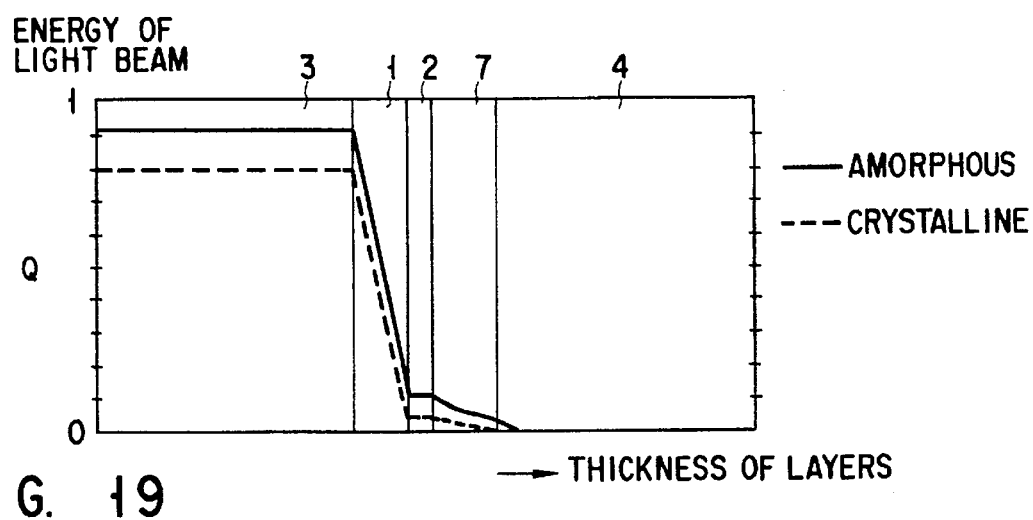
F I G. 19
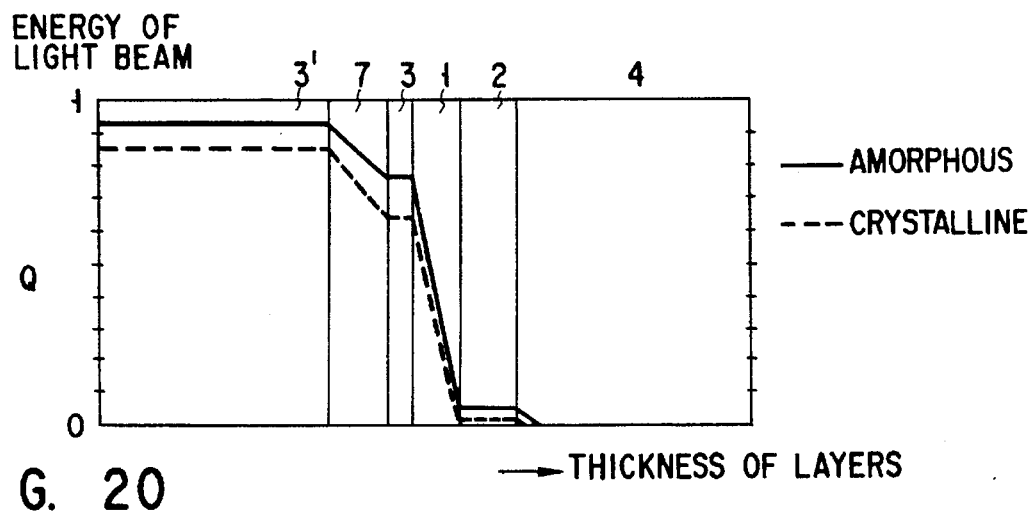
F I G. 20
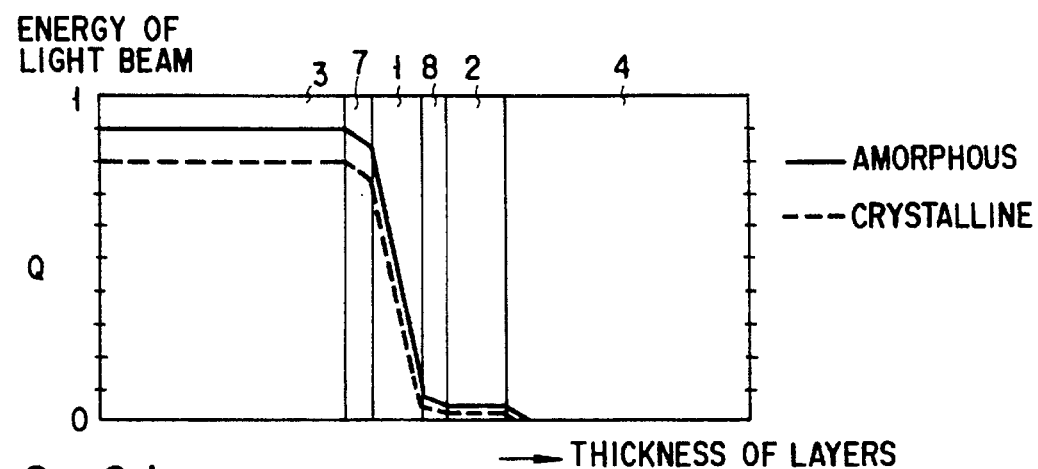
F I G. 21

INFORMATION RECORDING MEDIUM AND METHOD OF MANUFACTURING THE SAME

BACKGROUND OF THE INVENTION

1. Field of the Invention

The present invention relates to an information recording medium having a phase-change type recording layer, such as an optical disk which can be used for recording and reproducing an information, and to a method of manufacturing the information recording medium.

2. Description of the Related Art

An optical disk having a recording layer formed of chalcogenide materials has been studied for use as an optical disk of phase-change type for recording and reproducing an information (hereinafter referred to simply as a phase-change type optical disk). For example, the publication, Material for a rewritable optical disk, H. Okuda, (issued by Kabushiki Kaisha Kogyo Chosakai, May 20, 1989, first edition) describes in detail a technical discussion on the conventional phase-change type optical disk. According to the conventional phase-change type optical disk, the recording and reproducing of information are performed by making use of a phase change between the crystalline state and the amorphous state of a chalcogenide recording layer. The mechanism of recording and reproducing information is performed as follows.

(1) Since the recording layer formed by means of sputtering or vapor evaporation is amorphous, the recording layer is further subjected to thermal annealing treatment or light beam irradiation thereby changing the amorphous recording layer into a crystalline recording layer, which is generally referred to as initialization (crystallization).

(2) A recording pulse of short wavelength and low power is irradiated to a portion of the crystalline recording layer to partially melt the portion which is then quenched to be amorphized forming an amorphous recording mark.

(3) An erasing pulse of long wavelength and low power is irradiated to the amorphous recording mark to crystallize and erase the amorphous recording mark.

A method of overwriting by superimposing an erasing pulse on a recording pulse is also studied now.

As for the multi-layer structure of the phase-change type optical disk, a structure having a dielectric protective layer, a phase-change recording layer, another dielectric protective layer and a metallic or alloyed reflective layer stacked in the mentioned order on an optical disk substrate is generally employed.

A multi-layer structure having a metallic layer interposed between an optical disk substrate and a phase-change recording layer has been suggested in Jpn. Pat. Appln. KOKAI Publication Nos. 62-226446 and 4-265541. Specifically, Jpn. Pat. Appln. KOKAI Publication No. 62-226446 discloses a multi-layer structure wherein a translucent metallic film is interposed as a light absorption layer between an optical disk substrate and a phase-change recording layer for improving the recording sensitivity of the phase transition recording layer. Jpn. Pat. Appln. KOKAI Publication No. 4-265541 discloses a multi-layer structure wherein a metallic film is interposed between an optical disk substrate and a phase-change recording layer for improving the reflectance of the optical disk.

In the multi-layered structure of the conventional phase-change type optical disk consisting generally of a dielectric protecting layer, a phase-change recording layer, another dielectric layer, a light-reflective layer made of a metal or alloy and an ultra-violet curing resin film stacked in the mentioned order, the light absorption of the recording layer becomes higher when the recording layer is in an amorphous state as compared with when the recording layer is in a crystalline state, so that a recording mark distortion is more likely to be caused especially when an information is recorded in high density.

SUMMARY OF THE INVENTION

Therefore, the object of the present invention is to provide an information recording medium which is capable of improving the difference in light absorption of the recording layer between the amorphous state and the crystalline state thereof.

Namely, according to a first aspect of the present invention, there is provided an information recording medium comprising:

a substrate;

a phase-change type recording layer capable of storing information therein through a phase-change of a portion thereof upon being irradiated by light beam;

a dielectric protecting layer formed on the recording layer;

a light-reflective layer formed of a metal or alloy; and a light-absorptive protecting layer comprising a dielectric material and at least one material selected from metals, semimetals and semiconductor materials and interposed between the dielectric protecting layer and the light-reflective layer.

According to a second aspect of the present invention, there is provided an information recording medium comprising:

a substrate;

a phase-change type recording layer capable of storing information therein through a phase-change of a portion thereof upon being irradiated by light beam;

a dielectric protecting layer interposed between the substrate and the recording layer; and a light-absorptive protecting layer comprising a dielectric material and at least one material selected from metals, semimetals and semiconductor materials and interposed between the substrate and the dielectric protecting layer.

According to a third aspect of the present invention, there is provided an information recording medium comprising:

a substrate;

a phase-change type recording layer capable of storing information therein through a phase-change of a portion thereof upon being irradiated by light beam;

a first dielectric protecting layer interposed between the substrate and the recording layer;

a second dielectric protecting layer formed on the recording layer;

a first light-absorptive protecting layer comprising a dielectric material and at least one material selected from metals, semimetals and semiconductor materials and interposed between the recording layer and the first dielectric protecting layer; and a second light-absorptive protecting layer comprising a dielectric material and at least one material selected from metals, semimetals and semiconductor materials and interposed between the recording layer and the second dielectric protecting layer.

According to a fourth aspect of the present invention, there is provided an information recording medium comprising:

a substrate;

a phase-change type recording layer capable of storing information therein through a phase-change of a portion thereof upon being irradiated by light beam;

a dielectric protecting layer formed on the recording layer;

a first light-absorptive protecting layer comprising a dielectric material and at least one material selected from metals, semimetals and semiconductor materials and interposed between the substrate and the recording layer; and a second light-absorptive protecting layer comprising a dielectric material and at least one material selected from metals, semimetals and semiconductor materials and interposed between the recording layer and the dielectric protecting layer.

According to a fifth aspect of the present invention, there is provided an information recording medium comprising:

a substrate;

a phase-change type recording layer capable of storing information therein through a phase-change of a portion thereof upon being irradiated by light beam;

a dielectric protecting layer interposed between the substrate and the recording layer;

a first light-absorptive protecting layer comprising a dielectric material and at least one material selected from metals, semimetals and semiconductor materials and interposed between the recording layer and the dielectric protecting layer; and a second light-absorptive protecting layer comprising a dielectric material and at least one material selected from metals, semimetals and semiconductor materials and formed on the recording layer.

According to a sixth aspect of the present invention, there is provided an information recording medium comprising:

a substrate;

a phase-change type recording layer capable of storing information therein through a phase-change of a portion thereof upon being irradiated by light beam;

a first dielectric protecting layer interposed between the substrate and the recording layer;

a second dielectric protecting layer formed on the recording layer; and a light-absorptive protecting layer comprising a dielectric material and at least one material selected from metals, semimetals and semiconductor materials and interposed between the recording layer and the first dielectric protecting layer.

According to a seventh aspect of the present invention, there is provided an information recording medium comprising:

a substrate;

a phase-change type recording layer capable of storing information therein through a phase-change of a portion thereof upon being irradiated by light beam;

a first dielectric protecting layer interposed between the substrate and the recording layer;

a second dielectric protecting layer formed on the recording layer; and a light-absorptive protecting layer comprising a dielectric material and at least one material selected from metals, semimetals and semiconductor materials and interposed between the recording layer and the second dielectric protecting layer.

According to an eighth aspect of the present invention, there is provided an information recording medium comprising:

a substrate;

a phase-change type recording layer capable of storing information therein through a phase-change of a portion thereof upon being irradiated by light beam;

a dielectric protecting layer formed on the recording layer; and a light-absorptive protecting layer comprising a dielectric material and at least one material selected from metals, semimetals and semiconductor materials and interposed between the recording layer and the dielectric protecting layer.

According to a ninth aspect of the present invention, there is provided an information recording medium comprising:

a substrate;

a phase-change type recording layer capable of storing information therein through a phase-change of a portion thereof upon being irradiated by light beam;

a dielectric protecting layer interposed between the substrate and the recording layer; and a light-absorptive protecting layer comprising a dielectric material and at least one material selected from metals, semimetals and semiconductor materials and disposed on the recording layer.

According to a tenth aspect of the present invention, there is provided an information recording medium comprising:

a substrate;

a phase-change type recording layer capable of storing information therein through a phase-change of a portion thereof upon being irradiated by light beam;

a dielectric protecting layer formed on the recording layer; and a light-absorptive protecting layer comprising a dielectric material and at least one material selected from metals, semimetals and semiconductor materials and interposed between the substrate and the recording layer.

According to an eleventh aspect of the present invention, there is provided an information recording medium comprising:

a substrate;

·a phase-change type recording layer capable of storing information therein through a phase-change of a portion thereof upon being irradiated by light beam;

a dielectric protecting layer interposed between the substrate and the recording layer; and a light-absorptive protecting layer comprising a dielectric material and at least one material selected from metals, semimetals and semiconductor materials and interposed between the dielectric protecting layer and the recording layer.

According to a twelfth aspect of the present invention, there is provided an information recording medium comprising:

a substrate;

a phase-change type recording layer capable of storing information therein through a phase-change of a portion thereof upon being irradiated by light beam;

a light-reflective layer made of a metal or alloy; and a light-absorptive protecting layer comprising a dielectric material and at least one material selected from metals, semimetals and semiconductor materials and interposed between the recording layer and the light-reflective layer.

According to a thirteenth aspect of the present invention, there is provided an information recording medium comprising:

a substrate;

a phase-change type recording layer and capable of storing information therein through a phase-change of a portion thereof upon being irradiated by light beam;

a light-reflective layer made of a metal or alloy; a first light-absorptive protecting layer comprising a dielectric material and at least one material selected from metals, semimetals and semiconductor materials and interposed between the substrate and the recording layer; and a second light-absorptive protecting layer comprising a dielectric material and at least one material selected from metals, semimetals and semiconductor materials and interposed between the recording layer and the light-reflecting layer.

According to a fourteenth aspect of the present invention, there is provided a method of manufacturing an information recording medium comprising a substrate; a phase-change type recording layer and capable of storing information therein through a phase-change of a portion thereof upon being irradiated by light beam; and a light-absorptive protecting layer comprising a dielectric material and at least one material selected from metals, semimetals and semiconductor materials, comprising the steps of;

forming the recording layer by way of a vapor deposition method; and forming the light-absorptive protecting layer by way of a vapor deposition method;

these steps being successively performed in a chamber maintained in a prescribed vacuum pressure without exposing the interior of the chamber to the air atmosphere.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 13 is a sectional view showing an example of phase-change type optical disk according to a fourth embodiment of the present invention;

FIG. 14 is a sectional view showing another example of phase-change type optical disk according to a fourth embodiment of the present invention;

FIG. 15 is a sectional view showing an example of phase-change type optical disk according to a fifth embodiment of the present invention;

FIG. 16 is a vertical sectional view schematically showing the structure of a sputtering apparatus to be used for the manufacture of an information recording medium of the present invention;

FIG. 17 is a horizontal sectional view of the sputtering apparatus shown in FIG. 16;

FIG. 18 shows a schematic view of the multi-layered structure of the conventional phase-change type optical disk;

FIG. 19 is a graph showing an evaluation on the light-absorption characteristics of the phase-change type optical disk No. 1 prepared in the Experiments of the present invention;

FIG. 20 is a graph showing an evaluation on the light-absorption characteristics of the phase-change type optical disk No. 2 prepared in the Experiments of the present invention;

FIG. 21 is a graph showing an evaluation on the light-absorption characteristics of the phase-change type optical disk No. 3 prepared in the Experiments of the present invention;

DETAILED DESCRIPTION OF THE PREFERRED EMBODIMENTS

The present invention will be further explained in detail with reference to the following preferred embodiments.

In the conventional phase-change type optical disk (an information recording medium), there has been generally adapted a multi-layered structure comprising a dielectric protecting layer, a phase-change recording layer, another dielectric protecting layer, a light-reflecting film formed of a metal or an alloy, and an ultraviolet curing layer stacked on a substrate in the mentioned order. However, a phase-change type optical disk having such a multi-layered structure is accompanied with a problem that the light absorption of the recording layer becomes higher when the recording layer is in an amorphous state than when the recording layer is in a crystalline state, so that a recording mark distortion is more likely to be caused especially when an information is recorded in high density. This may be ascribed to the fact that a recording mark overwritten on a recording mark in an amorphous state becomes larger than that formed on an erasing track in a crystalline state due to the higher light absorption in an amorphous state as mentioned above.

Therefore, in view of minimizing any difference or fluctuation in light absorption between an amorphous state and a crystalline state of the recording layer, there is proposed by the present invention the use of a light-absorptive protecting layer comprising a mixture of dielectric material and a metallic material.

With the use of such a light-absorptive protecting layer in a phase-change type optical disk, it has become possible to minimize the difference in light absorption between an amorphous state and a crystalline state of the recording layer, thus reducing the recording mark distortion.

It is also possible to employ this light-absorptive protecting layer as a protecting layer to be disposed in contact with the recording layer, provided that the light-absorptive protecting layer is formed of a mixture comprising a dielectric material and a material selected from a metal, semimetal or semiconductor material which is higher in melting point than that of the recording layer and free from any possibility of forming a solid solution with the recording layer.

The present invention will be further explained with reference to the accompanying drawings depicting various embodiments of the present invention.

FIRST EMBODIMENT

Figure 1:
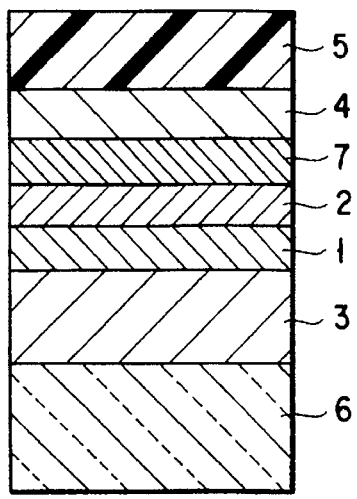
FIG. 1 is a sectional view showing an example of phase-change type optical disk according to a first embodiment of the present invention.

FIG. 1 schematically shows a multi-layered structure of the phase-change type optical disk according to a first embodiment of the present invention. As shown in FIG. 1, the phase-change type optical disk comprises a dielectric protecting layer 3, a recording layer 1, another dielectric protecting layer 2, a light-absorptive protecting layer 7, a light-reflecting layer 4 and a resinous protecting layer 5 stacked on a substrate 6 in the mentioned order.

The multi-layered structure is one example of optical disk of single-disk structure. It is also possible to make this disk into an optical disk of double-disk structure by laminating a pair of this single-disk type optical disk with the upper face of the recording layer of each disk being faced to each other. Further, depending on the end-use of the optical disk, the both protecting layers 3 and 5 may be omitted.

The optical disk substrate 6 may be formed of a material which is transparent and relatively small in change with time, examples of which are acrylic resin such as polymethylmethacrylate (PMMA), polycarbonate resin, epoxy resin, styrene resin and glass. This optical disk substrate 6 may be further provided with a continuous groove, sample servo mark or preformat mark, depending on the kinds of recording format.

The recording layer 1 is formed of a phase change material which is capable of changing its state as it is irradiated by a light beam. Examples of such a phase-change type material are chalcogenide-based amorphous semiconductors such as GeTe-based material, TeSe-based material, GeSbSe-based material, TeO$_x$-based material, InSe-based material and GeSbTe-based material; or compound semiconductors such as InSb-based material, GaSb-based material and InSbTe-based material. This recording layer 1 may be formed by means of a vacuum evaporation, a sputtering or the like. The thickness of the recording layer 1 may preferably be in the range of from several nanometers to several microns in practical use.

The protecting layers 2 and 3 are disposed in a manner to sandwich the recording layer 1 therebetween, thereby preventing the recording layer 1 from being scattered or holed due to the irradiation of a recording beam. The presence of these protective layers is also effective in controlling the thermal diffusion when the recording layer 1 is heated and cooled at the time of recording. These first and second protecting layers 2 and 3 may be formed by means of a vacuum evaporation a sputtering or the like using as a material SiO$_2$, SiO, AlN, Al$_2$O$_3$, ZrO$_2$, TiO$_2$, Ta$_2$O$_3$, ZnS, Si, Ge or a mixture thereof. The thickness of the protective layers 2 and 3 may preferably be in the range of from several nanometers to several microns in practical use.

The reflective layer 4 functions to optically enhance the optical change of the recording layer thereby to amplify the reproduction signal and also functions to cool the recording layer. The reflective layer 4 may be formed by means of a vacuum evaporation, a sputtering or the like using Au, Al, Cu, Ni-Cr or an alloy containing any one of these metals as a main component. The thickness of the reflective layer 25 may preferably be from several nanometers to several microns in practical use.

The resinous protective layer 5 is disposed for preventing the phase-change type optical disk from being damaged by a scratch or dust during the handling of the phase-change type optical disk. This resinous protective layer 5 is generally formed of an ultraviolet-curing resin. For example, this resinous protective layer 5 can be formed by coating an ultraviolet-curing resin on the surface of the reflective layer 4 by means of spin coating, which is then cured by the irradiation of ultraviolet rays. The thickness of the resinous protective layer 5 may preferably be in the range of from several microns to several hundred microns in practical use.

The light-absorptive protecting layer 7 is formed of a mixture comprising a dielectric material and at least one material selected from metals, semimetals and semiconductor materials. The dielectric material is non-absorptive to the light beam having a wavelength to be used in the optical recording. However, it is possible to provide material with a suitable light absorption by mixing the dielectric material with at least one kind of material selected from metals, semimetals and semiconductor materials, which are light-absorptive to the light beam having a wavelength to be used in the optical recording. In other words, it is possible to prepare a layer having a suitable film thickness and a suitable degree of light absorption by mixing the dielectric material with at least one material selected from metals, semimetals and semiconductor materials in a suitable mixing ratio. It may be conceivable to formulate such a protecting layer with the use only of metallic materials in view of providing the protecting layer with a sufficient degree of light absorption. However, if the protecting layer is formed only of metallic materials, the protecting layer may be required to be formed into a very thin film, because of its high light absorption characteristics, thus lowering or restricting freedom in designing the recording medium.

As for the dielectric material, it is possible to employ a dielectric material which is hardly light-absorptive to the light beam having a wavelength to be employed in practice. For example, SiO$_2$, SiO, AlN, Al$_2$O$_3$, ZrO$_2$, TiO$_2$, Ta$_2$O$_3$, ZnS, SiC, SiN or a mixture thereof may be used with respect to the wavelength of a semiconductor laser.

It should be noted that by the terms metals, semimetals or semiconductor materials, it is intended to include any of a simple substance, an alloy and an intermetallic compound in its definition. As for the metals, semimetals or semiconductor materials, a material which is light-absorptive to the light beam having a wavelength to be employed in practice can be employed. For example, a Group IIIa element in the periodic table such as Y; a Group IVa element such as Ti or Zr; a Group Va element such as V, Nb or Ta; a Group VIa element such as Cr, Mo or W; a Group VIIa element such as Fin; a Group VIII element such as Fe, Ru, Co, Rh, Ir, Ni, Pd or Pt; a Group Ib element such as Cu, Ag or Au; a Group IIb element such as Zn or Cd; a Group IIIb element such as B, Al or In; a Group IVb element such as C, Si, Ge, Sn or Pb; a Group Vb element such as Sb or Bi; a Group VIb element such as Se or Te; and a mixture thereof may be employed with respect to the wavelength of a semiconductor laser.

The mixing ratio between the dielectric material and at least one material selected from metals, semimetals and semiconductor materials for the preparation of the light-absorptive protecting layer 7 may be suitably determined depending on the degree of light-absorption to be required. Namely, since the light-absorption coefficient of the dielectric material is essentially zero, the amount of the metallic material is suitably determined so as to make the light-absorption coefficient higher than zero. In this case, it is preferable to determine the amount of at least one material selected from metals, semimetals and semiconductor materials so as to make the light-absorption coefficient of the light-absorptive protecting layer 7 fall in the range of from 0.01 to 9.0. If this light-absorption coefficient is set to less than 0.01, it would be difficult to obtain a sufficient light-absorption effect, whereas if this light absorption coefficient is set to higher than 9.0, the light-absorptive protecting layer 7 is required to be formed into a thin film, since the light-absorption coefficient of the resultant light-absorptive protecting layer 7 is high so that the margin of designing the optical disk may be undesirably reduced.

Namely, it is desired that the film thickness of this light-absorptive protecting layer 7 should be such that it does not completely cut off the light beam to be employed in the optical recording and reproducing in view of the function thereof as a practically useful light-absorptive protecting layer, and that it satisfies other optical and thermal requirements, i.e., it is desired that the film thickness of the light-absorptive protecting layer 7 should be in the range of several nanometers to several microns.

The light-absorptive protecting layer 7 may be formed by way of a vapor-phase deposition method such as sputtering or vacuum evaporation. If sputtering is to be adopted for example in this case, a target made of a metal or an alloy for constituting the light-absorptive protecting layer 7 is employed. It is also possible to perform the formation of this light-absorptive protecting layer 7 by way of co-sputtering using as target materials the whole constituent materials of the protective layer 7.

Since a metallic thin film is highly reactive and absorptive, the formations of the recording layer 1, the protective layer 2, the light-absorptive protecting layer 7 and the light-reflecting layer 4 are preferably formed in a successive manner without interrupting the vacuum within the reaction chamber.

SECOND EMBODIMENT

Figure 2:
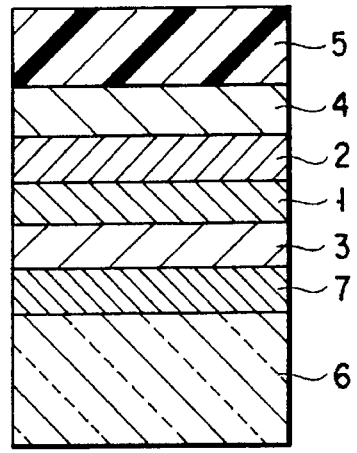
FIG. 2 is a sectional view showing an example of phase-change type optical disk according to a second embodiment of the present invention.

FIG. 2 schematically shows a multi-layered structure of the phase-change type optical disk according to a second embodiment of the present invention. As shown in FIG. 2, the phase-change type optical disk comprises a light-absorptive protecting layer 7, a dielectric protecting layer 3, a recording layer 1, another dielectric protecting layer 2, a light-reflecting layer 4 and a resinous protecting layer 5 stacked on a substrate 6 in the mentioned order. This embodiment differs from the first embodiment explained above in the position of the light-absorptive protecting layer 7 to be disposed in the multi-layered structure of the optical disk.

The multi-layered structure is one example of optical disk of single-disk structure. It is also possible to make this disk into an optical disk of double-disk structure by laminating a pair of this single-disk type optical disk with the upper face of the recording layer of each disk being faced to each other. Further, depending on the end-use of the optical disk, the both protective layers 3 and 5 may be omitted.

Any of the substrate 6, the light-absorptive protecting layer 7, the dielectric protecting layer 3, the recording layer 1, the dielectric protecting layer 2, the light-reflecting layer 4 and the resinous protecting layer 5 can be formulated in the same manner as in the case of the first embodiment.

It is also preferable to form the light-absorptive protecting layer 7, the dielectric protecting layer 3, the recording layer 1, the dielectric protecting layer 2 and the light-reflecting layer 4 in a successive manner without interrupting the vacuum within the reaction chamber as in the case of the first embodiment.

Figure 3:
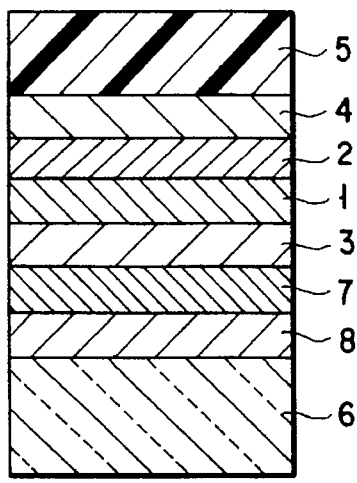
FIG. 3 is a sectional view showing another example of phase-change type optical disk according to a second embodiment of the present invention.

It is also possible in this multi-layered structure to form in advance another dielectric protective layer 8 on the surface of the substrate 6 for the optical disk as shown in FIG. 3, and then stack on this dielectric protecting layer 8 a set of layers consisting of the light-absorptive protecting layer 7, the dielectric protecting layer 3, the recording layer 1, the dielectric protecting layer 2 and the light-reflecting layer 4. As to the formation of this dielectric protecting layer 8 to be disposed on the substrate 6, the same material as used in the formation of the protective layer 3 can be employed and formed into a film of any desired thickness.

THIRD EMBODIMENT

Figure 4:
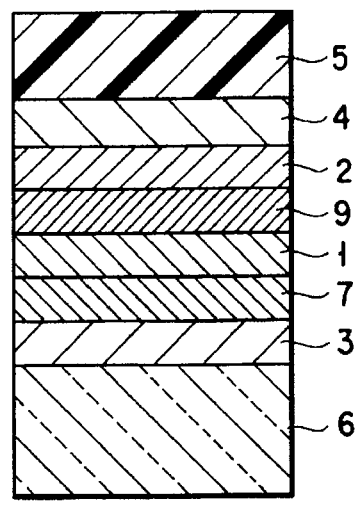
FIG. 4 is a sectional view showing an example of phase-change type optical disk according to a third embodiment of the present invention.

FIG. 4 schematically shows a multi-layered structure of the phase-change type optical disk according to a third embodiment of the present invention. As shown in FIG. 4, this phase-change type optical disk comprises a dielectric protecting layer 3, a light-absorptive protecting layer 7, a recording layer 1, another light-absorptive protecting layer 9, another dielectric protecting layer 2, a light-reflecting layer 4 and a resinous protecting layer 5 stacked on a substrate 6 in the mentioned order.

The multi-layered structure is one example of optical disk of single-disk structure. It is also possible to make this disk into an optical disk of double-disk structure by laminating a pair of this single-disk type optical disk with the upper face of the recording layer of each disk being faced to each other. Further, depending on the end-use of the optical disk, either the light-reflective layer 4 or the resinous protecting layer 5, or both of them may be omitted.

Any of the substrate 6, the dielectric protecting layer 3, the recording layer 1, the dielectric protecting layer 2, the light-reflecting layer 4 and the resinous protecting layer 5 can be formulated in the same manner as in the case of the first embodiment.

The light-absorptive protecting layer 7 is interposed between the protective layer 3 and the recording layer 1, and comprises a mixture of a dielectric material and at least one material selected from metals, semimetals and semiconductor materials. The dielectric material is non-absorptive to the light beam having a wavelength to be used in the optical recording. However, it is possible to provide material with a suitable light absorption by mixing with the dielectric material with at least one kind of material selected from metals, semimetals and semiconductor materials, which is light-absorptive to the light beam having a wavelength to be used in the optical recording. This light-absorptive protecting layer 7 can be essentially formulated in the same manner as explained in the above embodiments. However, since this protecting layer 7 is formed in contact with the recording layer 1, the material formed of at least one material selected from metals, semimetals and semiconductor materials for constituting the protecting layer 7 should preferably have a melting point higher than that of the recording layer 1 to avoid diffusion atoms between the protecting layer 7 and the recording layer 1. With the employment of such a material, it is now possible to avoid the formation of a solid solution with a material of the recording layer in the occasion of a light beam irradiation. It is more preferable that the melting point of the material constituting the protecting layer 7 should preferably have a melting point of at least three times (based on Celsius) higher than that of the recording layer 1.

If these metallic materials are in a heated state at a temperature lower than half of the melting point thereof, they are kept in a cold working state so that they can be inhibited from being diffused.

For example, when a GeSeTe-based recording layer having a melting point of about 600° is employed, a metal, an alloy or a compound having a melting point of about 1800° C. or more, such as W, Ta, Re, Ir, Os, Hf, Mo, Nb, Ru, Tc, Rh, Zr, an alloy thereof, or other compound such as Ta-W, Mo-Si, W-Si or Nb-Al may be suitably used as the protecting layer 7.

The light-absorptive protecting layer 9 is interposed between the protective layer 2 and the recording layer 1, and formed of a mixture of a dielectric material and at least one material selected from metals, semimetals and semiconductor materials. This light-absorptive protecting layer 9 may be formulated in the same manner as that of the light-absorptive protecting layer 7. Since this protecting layer 9 is also formed in contact with the recording layer 1, the material formed of at least one material selected from metals, semimetals and semiconductor materials for constituting the protecting layer 9 should preferably have a melting point higher than that of the recording layer 1. It is more preferable that the melting point of the material constituting the protecting layer 9 should preferably have a melting point of at least three times (based on Celsius) higher than that of the recording layer 1. Furthermore, this light-absorptive protecting layer 9 may be formed in the same manner as in the case of the light-absorptive protecting layer 7.

The material constituting this light-absorptive protecting layer 9 may be the same with or different from the material constituting the light-absorptive protecting layer 7. It is also possible in this embodiment to omit any one of these light-absorptive protecting layers 7 and 9.

Further, any one of the dielectric protecting layers 2 and 3 may also be omitted.

FIGS. 5 to 12 illustrate various embodiments wherein any one of the light-absorptive protecting layers is omitted.

Figure 5:
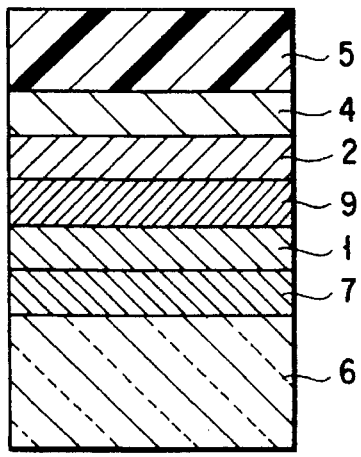
FIGS. 5 to 12 respectively shows a sectional view showing another example of phase-change type optical disk according to a third embodiment of the present invention.
Figure 6:
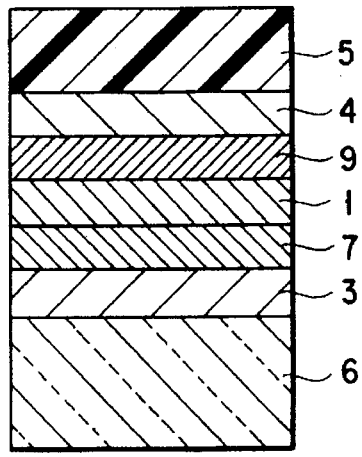
Figure 7:
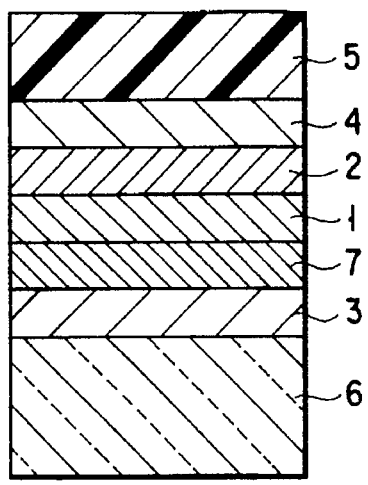
Figure 8:
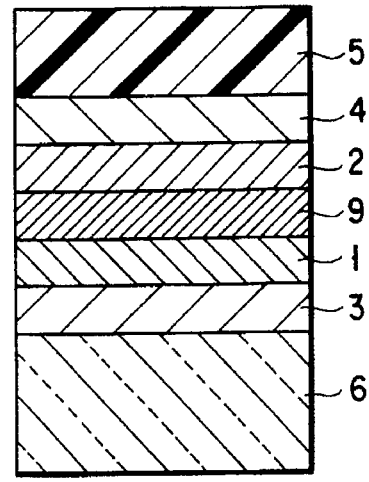
Figure 9:
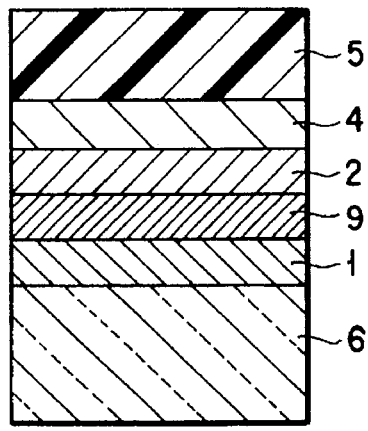
Figure 10:
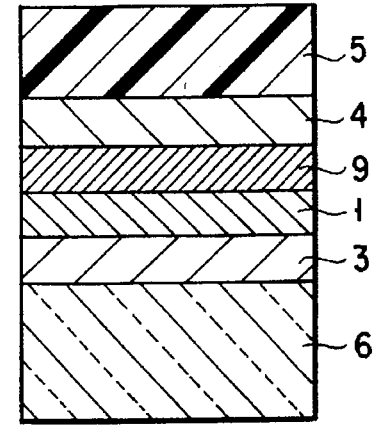
Figure 11:
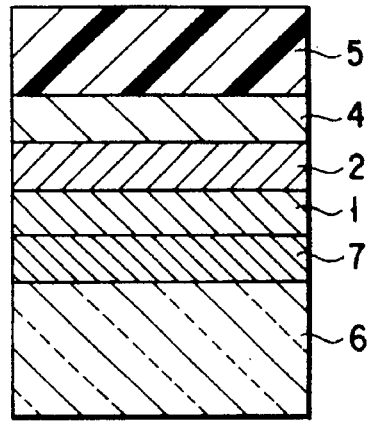
Figure 12:
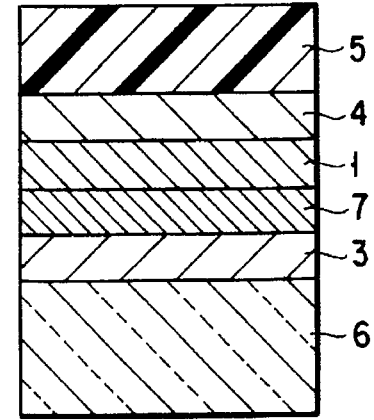

Namely, in FIG. 5, the dielectric protecting layer 3 is omitted from the multi-layered structure shown in FIG. 4, and in FIG. 6, the dielectric protecting layer 2 is omitted from the structure shown in FIG. 4. In FIG. 7, the light-absorptive protecting layer 9 is omitted from the structure shown in FIG. 4, and in FIG. 8, the light-absorptive protecting layer 7 is omitted from the structure shown in FIG. 4. In FIG. 9, both of the dielectric protecting layer 3 and the light-absorptive protecting layer 7 are omitted from the multi-layered structure shown in FIG. 4. In FIG. 10, both of the dielectric protecting layer 2 and the light-absorptive protecting layer 7 are omitted from the multi-layered structure shown in FIG. 4. In FIG. 11, both of the dielectric protecting layer 3 and the light-absorptive protecting layer 9 are omitted from the multi-layered structure shown in FIG. 4. In FIG. 12, both of the dielectric protecting layer 2 and the light-absorptive protecting layer 9 are omitted from the multi-layered structure shown in FIG. 4.

Since a metallic thin film is highly reactive and absorptive, the formations of the dielectric protecting layer 3, the light-absorptive protecting layer 7, the recording layer 1, the light-absorptive protecting layer 9, the dielectric protecting layer 2 and the light-reflecting layer 4 are preferably formed in a successive manner without interrupting the vacuum within the reaction chamber.

FOURTH EMBODIMENT

FIG. 13 schematically shows a multi-layered structure of the phase-change type optical disk according to a fourth embodiment of the present invention. As shown in FIG. 13, the phase-change type optical disk comprises a dielectric protecting layer 3, a recording layer 1, a light-absorptive protecting layer 7, a light-reflecting layer 4 and a resinous protecting layer 5 stacked on a substrate 6 in the mentioned order.

The multi-layered structure is one example of optical disk of single-disk structure. It is also possible to make this disk into an optical disk of double-disk structure by laminating a pair of this single-disk type optical disk with the upper face of the recording layer of each disk being faced to each other. Further, depending on the end-use of the optical disk, either the dielectric protecting layer 3 or the resinous protecting layer 5, or both of them may be omitted.

Any of the substrate 6, the dielectric protecting layer 3, the recording layer 1, the light-absorptive protecting layer 7, the light-reflecting layer 4 and the resinous protecting layer 5 can be formulated in the same manner as in the case of the first embodiment.

The light-absorptive protecting layer 7 is interposed between the light-reflecting layer 4 and the recording layer 1. Since this protecting layer 7 is formed in contact with the recording layer 1 as in the case of the third embodiment, the material formed of at least one material selected from metals, semimetals and semiconductor materials for constituting the protecting layer 7 should preferably have a melting point higher than that of the recording layer 1 in view of preventing the diffusion of atoms between the protecting layer 7 and the recording layer 1. It is more preferable that the melting point of the material constituting the protecting layer 7 should preferably have a melting point of at least three times (based on Celsius) higher than that of the recording layer 1.

Since a metallic thin film is highly reactive and absorptive, the formations of the recording layer 1, the light-absorptive protecting layer 7 and the light-reflecting layer 4 are preferably formed in a successive manner without interrupting the vacuum within the reaction chamber.

It is also possible to interpose another light-absorptive protecting layer 7' constructed in the same manner as that of the light-absorptive protecting layer 7 between the dielectric layer 3 and the recording layer 1 as shown in FIG. 14.

FIFTH EMBODIMENT

FIG. 15 schematically shows a multi-layered structure of the phase-change type optical disk according to a fifth embodiment of the present invention. As shown in FIG. 15, the phase-change type optical disk comprises a dielectric protecting layer 3, a recording layer 1, a light-absorptive protecting layer 7 and a resinous protecting layer 5 stacked on a substrate 6 in the mentioned order.

The multi-layered structure is one example of optical disk of single-disk structure. It is also possible to make this disk into an optical disk of double-disk structure by laminating a pair of this single-disk type optical disk with the upper face of the recording layer of each disk being faced to each other. Further, depending on the end-use of the optical disk, either the dielectric protecting layer 3 or the resinous protecting layer 5, or both of them may be omitted.

Any of the substrate 6, the dielectric protecting layer 3, the recording layer 1, the light-absorptive protecting layer 7 and the resinous protecting layer 5 can be formulated in the same manner as in the case of the above embodiments.

The light-absorptive protecting layer 7 is disposed on the recording layer 1. Since this protecting layer 7 is formed in contact with the recording layer 1 as in the case of the fourth embodiment, the material formed of at least one material selected from metals, semimetals and semiconductor materials for constituting the protecting layer 7 should preferably have a melting point higher than that of the recording layer 1 in view of preventing the diffusion of atoms between the protecting layer 7 and the recording layer 1. It is more preferable that the melting point of the material constituting the protecting layer 7 should preferably have a melting point of at least three times (based on Celsius) higher than that of the recording layer 1.

Since a metallic thin film is highly reactive and absorptive, the formations of the recording layer 1 and the light-absorptive protecting layer 7 are preferably formed in a successive manner without interrupting the vacuum within the reaction chamber.

MANUFACTURING METHOD

In the followings, an example of manufacturing an information recording medium (a phase-change type optical disk) according to the embodiments 1 to 5 will be explained with reference to FIGS. 16 and 17.

FIG. 16 schematically shows a vertical sectional view of the construction of a sputtering apparatus for manufacturing the information recording medium, and FIG. 17 shows a horizontal sectional view thereof. Referring to these FIGS. 16 and 17, a vacuum vessel 10 is provided at the bottom thereof with a gas-inlet port 11 and a gas-outlet port 12. The gas-outlet port 12 is communicated with a gas-discharging apparatus 13 through which the gas within the vacuum vessel 10 is discharged from the gas-outlet port 12. The gas-inlet port 11 is communicated with an argon gas cylinder 14 through which argon gas for use as a sputtering gas is introduced via the gas-inlet port 11 into the vacuum vessel 10.

On the upper portion inside the vacuum vessel 10 is suspended a disk-like rotatable table 15 for supporting a substrate on its lower surface, the table 15 being kept in the horizontal state and adapted to be rotated by a motor not shown.

Near the bottom inside the vacuum vessel 10 are separately disposed sputtering sources for forming each of the layers of the optical disk, each facing to the table 15. Namely, there are a sputtering source 21 consisting of a Ge-Sb-Te-based material for the recording layer 1, a sputtering source 22 consisting of a Zn-S-based material for both of the protective layers 2 and 3, a sputtering source 23 consisting of an Al alloy for the light-reflecting layer 4, and a sputtering source 24 consisting for example of ZnS-SiO$_2$-W for the light-absorptive protecting layer 7 and/or the light-absorptive protecting layer 9, each sputtering source being individually connected to a high frequency electric source not shown.

Over these sputtering sources 21, 22, 23 and 24 are respectively disposed a monitoring device (in the drawing, only the monitoring devices 25 and 27 directed respectively to the sputtering sources 21 and 23 are shown). With these monitoring devices, it is possible to monitor the amount of sputtering from each sputtering source, and thereby to adjust the time period of sputtering from each of the sputtering sources so as to adjust the thickness of each layer to be formed.

In the actual use of this sputtering apparatus, the interior of vacuum vessel 10 is first evacuated through an evacuating device up to a vacuum degree for example of the order of $10^{-6}$ Torr. Then, argon gas is introduced into the vacuum vessel 10 through the gas inlet port 11 and at the same time the discharging rate of argon gas through the gas-discharging apparatus 13 is adjusted so as to keep the argon gas atmosphere within the vacuum vessel 10 to a predetermined value. Under this condition, electric power is applied in turn according to the order of the layers (starting from the lowest layer) to each sputtering source for a predetermined period of time while keeping the substrate 6 rotated, thereby forming a predetermined multi-layered structure on the substrate 6.

In the present invention, the light-absorptive protecting layer 7 (the light-absorptive protecting layers 7 and 9 in the case of the third embodiment where the light-absorptive protecting layer 9 is additionally provided) and/or the light-absorptive protecting layer 9 is formed without opening the vacuum vessel 10 thus not exposing the interior of the vacuum vessel 10 to the air atmosphere before and after the formation of these layers. Therefore, it is possible to prevent the oxidation or contamination with dust of the light-absorptive protecting layer 7 and/or the light-absorptive protecting layer 9 or the recording layer 1, and at the same time to improve the adherence of the light-absorptive protecting layer 7 and/or the light-absorptive protecting layer 9 to the recording layer 1.

EXPERIMENTS

Disks Nos. 1 to 5, each being manufactured according to the above manufacturing method and having a multi-layered structure as illustrated below were obtained.

Further, in order to compare the recording performances of these disks with the conventional disk, a conventional disk No. 6 having a multi-layered structure as shown in FIG. 18 was prepared.

This conventional disk No. 6 was of the same multi-layered structure as that of the first embodiment except that the light-absorptive protecting layer 7 was omitted therefrom, i.e., a multi-layered structure comprising a dielectric protecting layer 3, a recording layer 1, another dielectric protecting layer 2, a light-reflecting layer 4 and a resinous protecting layer 5 stacked on a substrate 6 in the mentioned order.

Disk No. 1 was the one according to the first embodiment, and provided with the light-absorptive protecting layer 7 made of ZnS-SiO$_2$-W between the light-reflecting layer 4 and the dielectric protecting layer 2. To be more specific, the disk No. 1 was constituted by, as mentioning from the substrate side, a ZnS-based protecting layer 3 (100 nm in thickness), a GeSbTe recording layer 1 (20 nm in thickness), a ZnS-based protecting layer 2 (10 nm in thickness), a ZnS-SiO$_2$-W-based light-absorptive protecting layer 7 (25 nm in thickness) and an Al-based light-reflecting layer 4 (100 nm in thickness).

Disk No. 2 was the one according to the second embodiment, and featured in that the light-absorptive protecting layer 7 consisting of ZnS-SiO$_2$-W was disposed on the substrate 1 with the protecting layer 3 interposed therebetween. Specifically, the disk No. 2 was consisted of, as mentioning from the substrate side, as mentioning from the substrate side, a ZnS-based protecting layer 3 (100 nm in thickness), a ZnS-SiO$_2$-W-based light-absorptive protecting layer 7 (25 nm in thickness), a ZnS-based protecting layer 2 (10 nm in thickness), a GeSbTe recording layer 1 (20 nm in thickness), a ZnS-based protecting layer 2 (25 nm in thickness) and an Al-based light-reflecting layer 4 (100 nm in thickness).

Disk No. 3 was the one according to the third embodiment, and provided with the light-absorptive protecting layers 7 and 9, each being made of ZnS-SiO$_2$-W and interposed respectively between the dielectric protecting layer 3 (disposed closely to the substrate) and the recording layer 1, and between the recording layer 1 and the dielectric protecting layer 2. To be more specific, the disk No. 3 was constituted by, as mentioning from the substrate side, a ZnS-based protecting layer 3 (100 nm in thickness), a GeSbTe recording layer 1 (20 nm in thickness), a W-based light-absorptive protecting layer 8 (10 nm in thickness), a ZnS-based protecting layer 2 (25 nm in thickness) and an Al-based light-reflecting layer 4 (100 nm in thickness).

Disk No. 4 was the one according to the fourth embodiment, and provided with the light-absorptive protecting layer 7 made of ZnS-SiO$_2$-W between the light-reflecting layer 4 and the recording layer 1. To be more specific, the disk No. 1 was constituted by, as mentioning from the substrate side, a ZnS-based protecting layer 3 (100 nm in thickness), a GeSbTe recording layer 1 (20 nm in thickness), a ZnS-SiO$_2$-W-based light-absorptive protecting layer 7 (25 nm in thickness) and an Al-based light-reflecting layer 4 (100 nm in thickness).

Disk No. 5 was the one according to the fifth embodiment, and featured in that the light-absorptive protecting layer 7 consisting of ZnS-SiO$_2$-W was disposed on the substrate 1. Specifically, the disk No. 5 was consisted of, as mentioning from the substrate side, as mentioning from the substrate side, a ZnS-based protecting layer 3 (100 nm in thickness), a GeSbTe recording layer 1 (20 nm in thickness) and a ZnS-SiO$_2$-W-based light-absorptive protecting layer 7 (500 nm in thickness).

Disk No. 6 was the one of the conventional optical disk, and was constituted by, as mentioning from the substrate side, a ZnS-based protecting layer 3 (100 nm in thickness), a GeSbTe recording layer 1 (20 nm in thickness), a ZnS-based protecting layer 2 (25 nm in thickness) and an Al-based light-reflecting layer 4 (100 nm in thickness).

In each of these disks, a substrate having a diameter of 86 mm was employed, and the evaluation of each disk was made using a light beam of 680 nm in wavelength.

The light-absorptive protecting layer was made of a material comprising a ZnS-SiO$_2$-based dielectric material containing tungsten (W) mixed therein. The melting point of W is about 3380° C. which is more than three times higher than that (about 600° C.) of the GeSbTe constituting the recording layer 1. Further, W is excellent in thermal stability and in wettability to GeSbTe as it is used in contact with the recording layer 1. When the optical constant of the ZnS-SiO$_2$-based dielectric material was measured at the wavelength of 680 nm, the refractive index thereof was found to be 2.0. However, when ZnS-SiO$_2$ was co-sputtered together with W, the resultant mixed material was found to have a refractive index of 2.8 and an absorption coefficient of 0.4. As apparent from this, it is possible to adjust the refractive index and the light absorption coefficient of the light-absorptive protecting layer by controlling the amount of W to be mixed.

These six kinds of disks were evaluated of their recording layer with respect to the light absorption characteristics by way of an optical calculation. The optical constants as used in the optical calculation of each recording layer at a wavelength of 680 nm are shown in Table 1. These values are based on the actual measurement.

TABLE 1

| Optical Constants at wavelength of 680 nm | | |
|---|---|---|
| | Reflective index | Absorption coefficient |
| Al-based reflecting layer | 1.5 | 7.0 |
| ZnS-based protecting layer | 2.0 | — |
| GeSbTe-based recording layer | | |
| Amorphous state | 4.3 | 1.8 |
| Crystalline state | 4.1 | 3.6 |
| ZnS—SiO$_2$—W light absorptive protecting layer | 2.8 | 0.4 |
| UV film | 1.47 | — |
| Substrate | 1.55 | — |

The results are shown in FIGS. 19 to 24.

Figure 22:
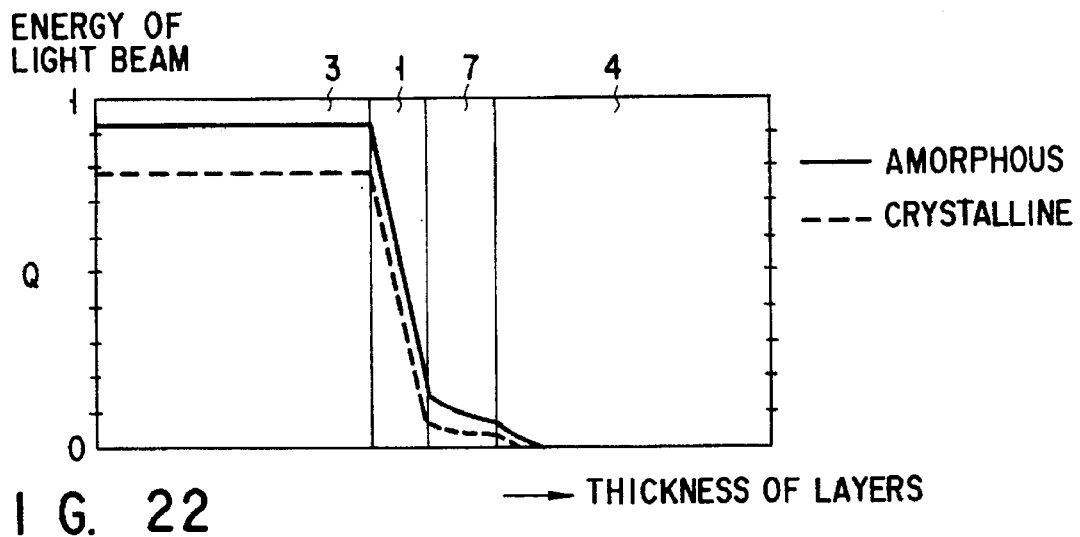
FIG. 22 is a graph showing an evaluation on the light-absorption characteristics of the phase-change type optical disk No. 4 prepared in the Experiments of the present invention.
Figure 23:
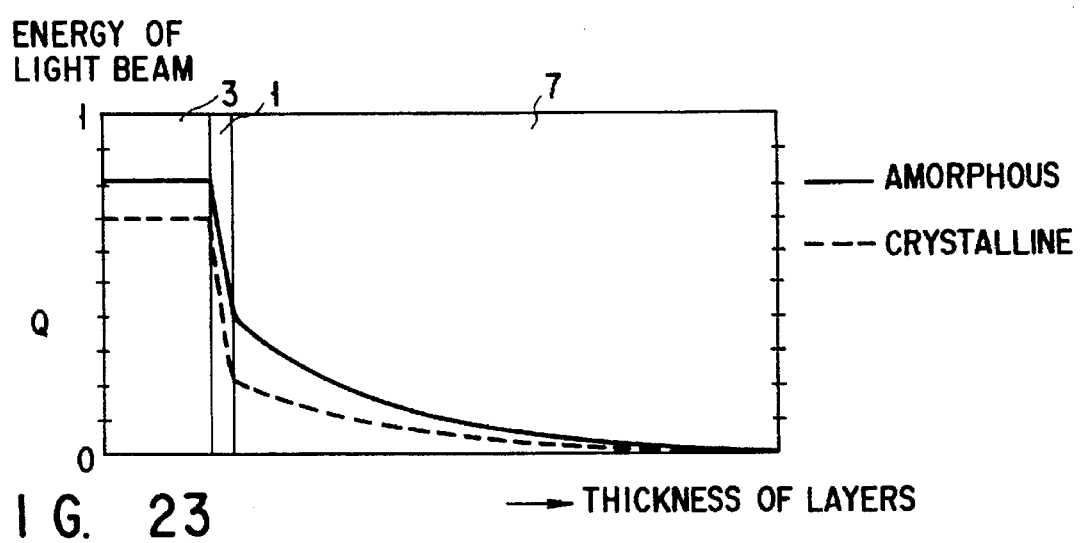
FIG. 23 is a graph showing an evaluation on the light-absorption characteristics of the phase-change type optical disk No. 5 prepared in the Experiments of the present invention.
Figure 24:
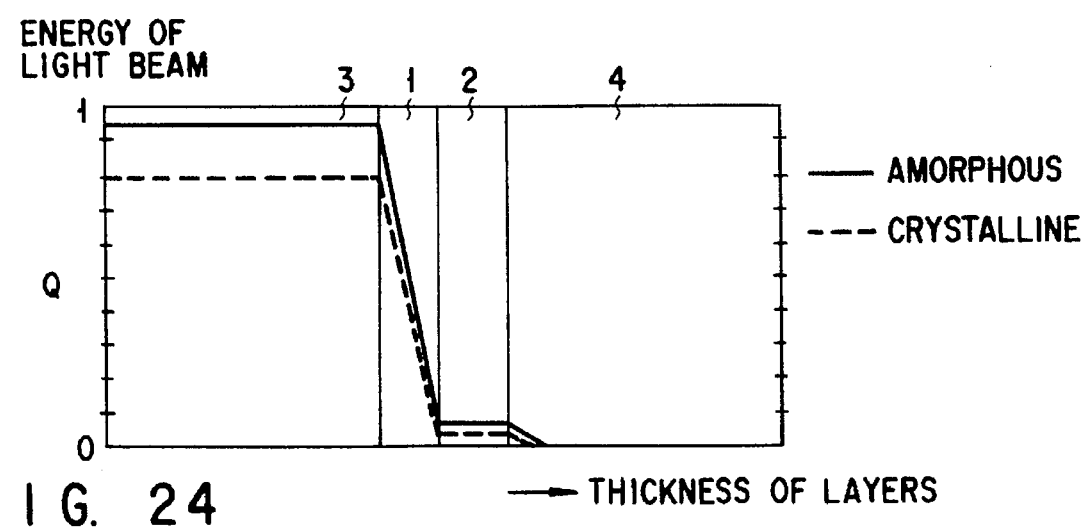
FIG. 24 is a graph showing an evaluation on the light-absorption characteristics of the conventional phase-change type optical disk No. 6.

FIG. 19 shows the light absorption of each layer when the recording layer of disk No. 1 is in an amorphous state (a solid line) or crystalline state (dotted line). FIG. 20 shows the light absorption of each layer when the recording layer of disk No. 2 is in an amorphous state (a solid line) or crystalline state (dotted line). FIG. 21 shows the light absorption of each layer when the recording layer of disk No. 3 is in an amorphous state (a solid line) or crystalline state (dotted line). FIG. 22 shows the light absorption of each layer when the recording layer of disk No. 4 is in an amorphous state (a solid line) or crystalline state (dotted line). FIG. 23 shows the light absorption of each layer when the recording layer of disk No. 5 is in an amorphous state (a solid line) or crystalline state (dotted line). FIG. 24 shows the light absorption of each layer when the recording layer of the conventional disk No. 6 is in an amorphous state (a solid line) or crystalline state (dotted line).

The Table 2 shows the comparison of the light absorption coefficient of the recording layer of each disk.

TABLE 2

| | Absorption coefficient (%) | | Difference in absorption |
|---|---|---|---|
| Disk No. | Amorphous state a | Crystalline state | coefficient (%) a–c |
| 1 | 81 | 75 | 6 |
| 2 | 73 | 63 | 10 |
| 3 | 76 | 72 | 4 |
| 4 | 80 | 73 | 6 |

TABLE 2-continued

| Disk No. | Absorption coefficient (%) | | Difference in absorption coefficient (%) a–c |
|---|---|---|---|
| | Amorphous state a | Crystalline state | |
| 5 | 42 | 49 | −7 |
| 6 (Prior Art) | 89 | 77 | 12 |

As apparent from these results, in disk No. 6 representing the prior art, the light absorption in the amorphous state of the recording layer was 12% higher than when the recording layer was crystalline state. Whereas, in any of the disks No. 1 to No 5 representing the present invention, the difference in light absorption between the amorphous state and crystalline state was smaller than 12%, thus demonstrating a prominent improvement over the conventional optical disk with respect to the fluctuation of light absorption coefficient of the recording layer.

As explained above, it is possible according to the present invention to minimize the difference in light absorption of the recording layer between when it is in an amorphous state and when it is in a crystalline state as compared with the conventional optical disk, and therefore it has been confirmed that an information recording medium which is capable of realizing a high recording density can be obtained.

Moreover, since the adherence between the light absorptive protecting layer and any of the recording layer, dielectric protecting layer and light-reflecting layer can be improved according to the present invention, it is possible to provide a phase-change type optical disk of improved reliability can be obtained.

If the light absorptive protecting layer is disposed in contact with the recording layer of phase-change type, it is possible to omit the overlaying dielectric protecting layer or light-reflecting layer, thereby saving the manufacturing cost of the optical disk.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information recording medium comprising:
a substrate;
a phase-change type recording layer capable of storing information therein through a phase-change of a portion thereof upon being irradiated by a light beam;
a dielectric protecting layer interposed between the substrate and the recording layer; and
a light-absorptive protecting layer comprising a dielectric material that does not absorb light having a wavelength equal to that of the light beam which irradiates the recording layer and at least one material that absorbs light having a wavelength equal to that of the light beam which irradiates the recording layer and which is selected from metals, semimetals and semiconductor materials and interposed between the substrate and the dielectric protecting layer.

2. The information recording medium according to claim 1, wherein said dielectric material of the light-absorptive protecting layer is selected from the group consisting of $SiO_2$, SiO, AlN, $Al_2O_3$, $ZrO_2$, $TiO_2$, $Ta_2O_3$, ZnS, SiC, SiN and a mixture thereof.

3. The information recording medium according to claim 1, wherein said at least one material selected from metals, semimetals and semiconductor materials is selected from the group consisting of a Group IIIa element in the periodic table such as Y; a Group IVa element such as Ti or Zr; a Group Va element such as V, Nb or Ta; a Group VIa element such as Cr, Mo or W; a Group VIIa element such as Mn; a Group VIII element such as Fe, Ru, Co, Rh, Ir, Ni, Pd or Pt; a Group Ib element such as Cu, Ag or Au; a Group IIb element such as Zn or Cd; a Group IIIb element such as B, Al or In; a Group IVb element such as C, Si, Ge, Sn or Pb; a Group Vb element such as Sb or Bi; a Group VIb element such as Se or Te; and a mixture thereof.

4. The information recording medium according to claim 1, wherein said at least one material selected from metals, semimetals and semiconductor materials has a higher melting point than a material of said recording layer and hardly forms a solid solution with the material of said recording layer.

5. The information recording medium according to claim 4, wherein said at least one material selected from metals, semimetals and semiconductor materials has a melting point at least three times (based on Celsius) higher than a material of said recording layer.

6. The information recording medium according to claim 1, wherein a mixing amount of said material selected from metals, semimetals and semiconductor materials is determined so that the light-absorption coefficient of the light absorptive protecting layer falls with a range of between 0.01 and 9.0.

7. An information recording medium comprising:
a substrate;
a phase-change type recording layer capable of storing information therein through a phase-change of a portion thereof upon being irradiated by a light beam;
a first dielectric protecting layer interposed between the substrate and the recording layer;
a second dielectric protecting layer formed on the recording layer; and
a light-absorptive protecting layer comprising a dielectric material that does not absorb light having a wavelength equal to that of the light beam which irradiates the recording layer and at least one material that absorbs light having a wavelength equal to that of the light beam which irradiates the recording layer and which is selected from metals, semimetals and semiconductor materials and interposed between the recording layer and the first dielectric protecting layer.

8. The information recording medium according to claim 7, wherein said at least one material selected from metals, semimetals and semiconductor materials has a higher melting point than a material of said recording layer and hardly forms a solid solution with the material of said recording layer.

9. The information recording medium according to claim 8, wherein said at least one material selected from metals, semimetals and semiconductor materials has a melting point at least three times (based on Celsius) higher than a material of said recording layer.

10. The information recording medium according to claim 7, wherein said dielectric material of the light-absorptive protecting layer is selected from the group consisting of $SiO_2$, SiO, AlN, $Al_2O_3$, $ZrO_2$, $TiO_2$, $Ta_2O_3$, ZnS, SiC,SiN and a mixture thereof.

11. The information recording medium according to claim 7, wherein said at least one material selected from metals, semimetals and semiconductor materials is selected from the group consisting of a Group IIIa element in the periodic table such as Y; a Group IVa element such as Ti or Zr; a Group Va element such as V, Nb or Ta; a Group VIa element such as Cr, Mo or W; a Group VIIa element such as Mn; a Group VIII element such as Fe, Ru, Co, Rh, Ir, Ni, Pd or Pt; a Group Ib element such as Cu, Ag or Au; a Group IIb element such as Zn or Cd; a Group IIIb element such as B, Al or In; a Group IVb element such as C, Si, Ge, Sn or Pb; a Group Vb element such as Sb or Bi; a Group VIb element such as Se or Te; and a mixture thereof.

12. The information recording medium according to claim 7, wherein a mixing amount of said material selected from metals, semimetals and semiconductor materials is determined so that the light-absorption coefficient of the light absorptive protecting layer falls with a range of between 0.01 and 9.0.

13. An information recording medium comprising:

a substrate;

a phase-change type recording layer capable of storing information therein through a phase-change of a portion thereof upon being irradiated by a light beam;

a dielectric protecting layer formed on the recording layer; and a light-absorptive protecting layer comprising a dielectric material that does not absorb light having a wavelength equal to that of the light beam which irradiates the recording layer and at least one material that absorbs light having a wavelength equal to that of the light beam which irradiates the recording layer and which is selected from metals, semimetals and semiconductor materials and interposed between the substrate and the recording layer.

14. The information recording medium according to claim 13, wherein said at least one material selected from metals, semimetals and semiconductor materials has a higher me/ting point than a material of said recording layer and hardly forms a solid solution with the material of said recording layer.

15. The information recording medium according to claim 14, wherein said at least one material selected from metals, semimetals and semiconductor materials has a melting point at least three times (based on Celsius) higher than a material of said recording layer.

16. The information recording medium according to claim 13, wherein said dielectric material of the light-absorptive protecting layer is selected from the group consisting of $SiO_2$, SiO, AlN, $Al_2O_3$, $ZrO_2$, $TiO_2$, $Ta_2O_3$, ZnS, SiC,SiN and a mixture thereof.

17. The information recording medium according to claim 13, wherein said at least one material selected from metals, semimetals and semiconductor materials is selected from the group consisting of a Group IIIa element in the periodic table such as Y; a Group IVa element such as Ti or Zr; a Group Va element such as V, Nb or Ta; a Group VIa element such as Cr, Mo or W; a Group VIIa element such as Mn; a Group VIII element such as Fe, Ru, Co, Rh, Ir, Ni, Pd or Pt; a Group Ib element such as Cu, Ag or Au; a Group IIb element such as Zn or Cd; a Group IIIb element such as B, Al or In; a Group IVb element such as C, Si, Ge, Sn or Pb; a Group Vb element such as Sb or Bi; a Group VIb element such as Se or Te; and a mixture thereof.

18. The information recording medium according to claim 13, wherein a mixing amount of said material selected from metals, semimetals and semiconductor materials is determined so that the light-absorption coefficient of the light absorptive protecting layer falls with a range of between 0.01 and 9.0.

19. An information recording medium comprising:

a substrate;

a phase-change type recording layer capable of storing information therein through a phase-change of a portion thereof upon being irradiated by a light beam;

a dielectric protecting layer interposed between the substrate and the recording layer; and a light-absorptive protecting layer comprising a dielectric material that does not absorb light having a wavelength equal to that of the light beam which irradiates the recording layer and at least one material that absorbs light having a wavelength equal to that of the light beam which irradiates the recording layer and which is selected from metals, semimetals and semiconductor materials and interposed between the dielectric protecting layer and the recording layer.

20. The information recording medium according to claim 19, wherein said at least one material selected from metals, semimetals and semiconductor materials has a higher melting point than a material of said recording layer and hardly forms a solid solution with the material of said recording layer.

21. The information recording medium according to claim 20, wherein said at least one material selected from metals, semimetals and semiconductor materials has a melting point at least three times (based on Celsius) higher than a material of said recording layer.

22. The information recording medium according to claim 19, wherein said dielectric material of the light-absorptive protecting layer is selected from the group consisting of $SiO_2$, SiO, AlN, $Al_2O_3$, $ZrO_2$, $TiO_2$, $Ta_2O_3$, ZnS, SiC,SiN and a mixture thereof.

23. The information recording medium according to claim 19, wherein said at least one material selected from metals, semimetals and semiconductor materials is selected from the group consisting of a Group IIIa element in the periodic table such as Y; a Group IVa element such as Ti or Zr; a Group Va element such as V, Nb or Ta; a Group VIa element Such as Cr, Mo or W; a Group VIIa element such as Mn; a Group VIII element such as Fe, Ru, Co, Rh, Ir, Ni, Pd or Pt; a Group Ib element such as Cu, Ag or Au; a Group IIb element such as Zn or Cd; a Group IIIb element such as B, Al or In; a Group IVb element such as C, Si, Ge, Sn or Pb; a Group Vb element such as Sb or Bi; a Group VIb element such as Se or Te; and a mixture thereof.

24. The information recording medium according to claim 19, wherein a mixing amount of said material selected from metals, semimetals and semiconductor materials is determined so that the light-absorption coefficient of the light absorptive protecting layer falls with a range of between 0.01 and 9.0.

* * * * *